(12) United States Patent
Fischer et al.

(10) Patent No.: US 7,731,230 B2
(45) Date of Patent: Jun. 8, 2010

(54) AIR BAG WITH DEPLOYMENT FLAP

(75) Inventors: Kurt F. Fischer, Leonard, MI (US);
Heather R. Kramer, Macomb, MI (US);
Alberto Rodriguez, Rochester Hills, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 243 days.

(21) Appl. No.: 11/906,782

(22) Filed: Oct. 3, 2007

(65) Prior Publication Data

US 2009/0091111 A1 Apr. 9, 2009

(51) Int. Cl.
*B60R 21/16* (2006.01)

(52) U.S. Cl. .................. 280/732; 280/728.1; 280/731; 280/743.1

(58) Field of Classification Search ............. 280/728.1, 280/731, 732, 743.1
See application file for complete search history.

(56) References Cited

U.S. PATENT DOCUMENTS

| 5,160,164 | A | * | 11/1992 | Fischer et al. | 280/743.2 |
| 5,348,343 | A | * | 9/1994 | Hawthorn | 280/730.1 |
| 5,613,698 | A | * | 3/1997 | Patercsak et al. | 280/728.1 |
| 5,636,861 | A | * | 6/1997 | Orsulak et al. | 280/730.1 |
| 6,206,409 | B1 | * | 3/2001 | Kato et al. | 280/728.2 |
| 6,474,686 | B1 | * | 11/2002 | Higuchi et al. | 280/743.1 |
| 6,877,772 | B2 | | 4/2005 | Fischer et al. | |
| 6,955,377 | B2 | | 10/2005 | Cooper et al. | |
| 7,021,653 | B2 | * | 4/2006 | Burdock et al. | 280/730.1 |
| 7,090,248 | B2 | * | 8/2006 | Jenkins et al. | 280/743.1 |
| 7,441,804 | B2 | * | 10/2008 | Rose et al. | 280/743.1 |
| 7,568,730 | B2 | * | 8/2009 | Kwon | 280/743.2 |
| 2003/0189319 | A1 | * | 10/2003 | Soderquist | 280/728.3 |
| 2004/0239085 | A1 | * | 12/2004 | Vitet | 280/731 |
| 2004/0251669 | A1 | * | 12/2004 | Fischer et al. | 280/743.1 |
| 2006/0244248 | A1 | * | 11/2006 | Rose et al. | 280/743.1 |
| 2008/0217887 | A1 | * | 9/2008 | Seymour et al. | 280/728.2 |

* cited by examiner

*Primary Examiner*—Paul N Dickson
*Assistant Examiner*—James English
(74) *Attorney, Agent, or Firm*—Tarolli, Sundheim, Covell & Tummino LLP

(57) ABSTRACT

An apparatus (10) for helping to protect an occupant (20) of a vehicle (12) includes an inflatable vehicle occupant protection device (14) inflatable from a stored condition to a deployed condition in which the protection device is positioned between an instrument panel (36) of the vehicle and the vehicle occupant. The protection device (14) includes upper portion (142) and a lower portion (144), each of which is at least one of rolled and folded. The upper portion (142) and the lower portion (144) are positioned overlying each other when in the stored condition. A deployment flap (120) includes a sheet of material having a first end portion (130) secured to the vehicle. The deployment flap (120) has a central portion (134) that wraps around the lower portion (144) and a second end portion (132), opposite the first end portion (130), that is tucked under the lower portion while the protection device (14) is in the stored condition.

23 Claims, 7 Drawing Sheets

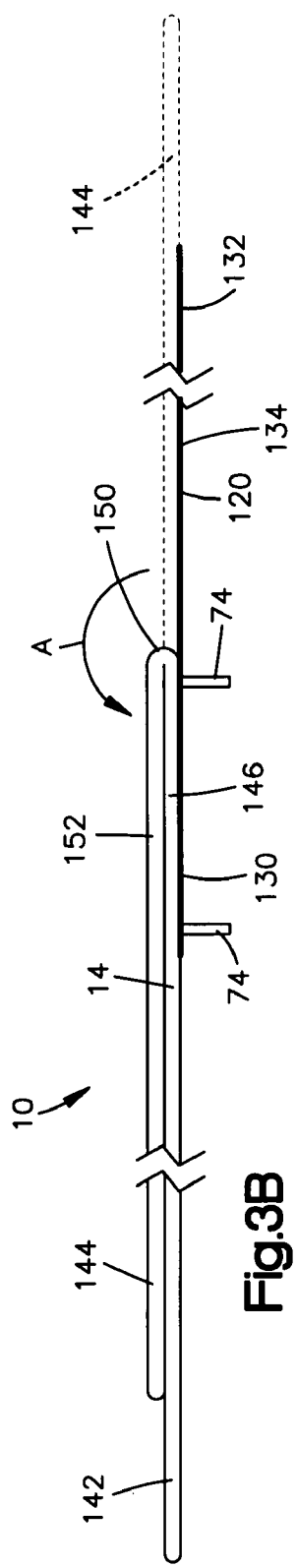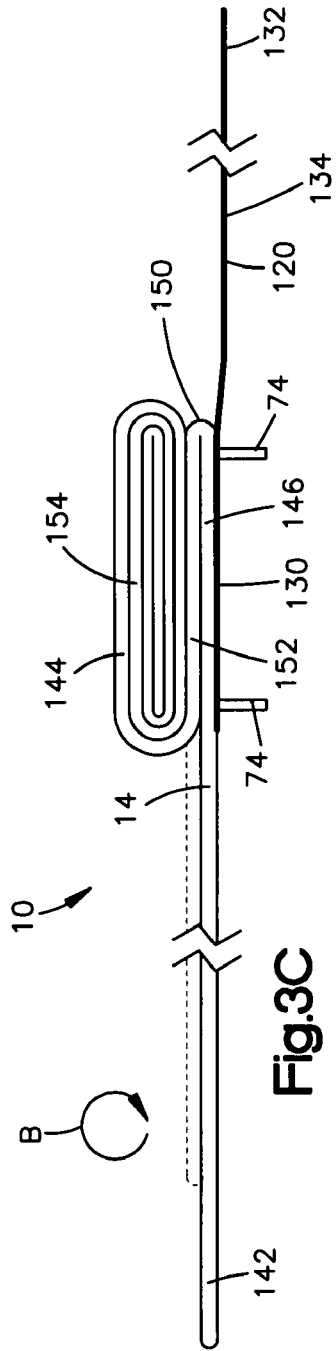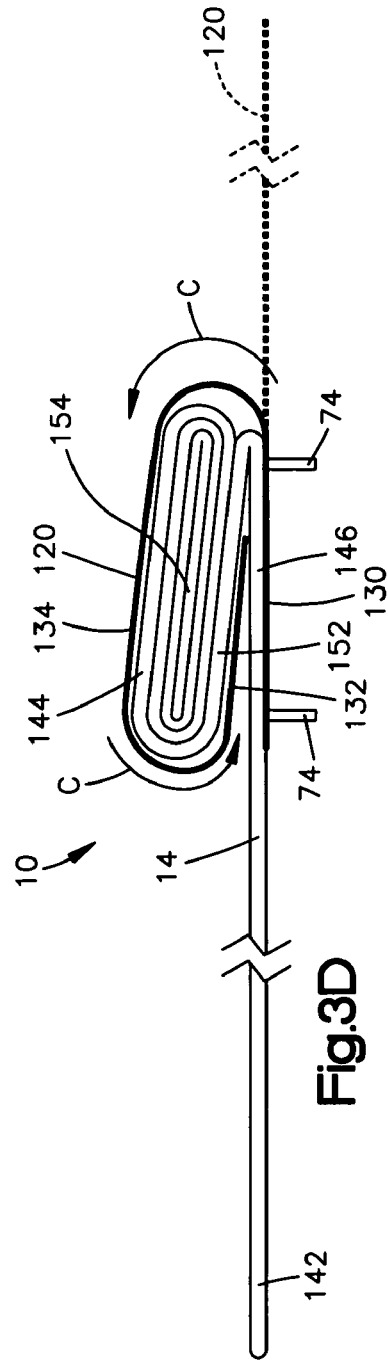

US 7,731,230 B2

AIR BAG WITH DEPLOYMENT FLAP

FIELD OF THE INVENTION

The present invention relates to an apparatus for helping to protect an occupant of a vehicle. More particularly, the present invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

SUMMARY OF THE INVENTION

The present invention relates to an apparatus for helping to protect an occupant of a vehicle includes an inflatable vehicle occupant protection device inflatable from a stored condition to a deployed condition in which the protection device is positioned between an instrument panel of the vehicle and the vehicle occupant. The protection device includes an upper portion and a lower portion. Each portion is at least one of rolled and folded, and the portions are positioned overlying each other when in the stored condition. A deployment flap includes a sheet of material having a first end portion secured to the vehicle. The deployment flap has a central portion that wraps around the lower portion and a second end portion, opposite the first end portion, that is tucked under the lower portion while the protection device is in the stored condition.

The present invention also relates to an apparatus for helping to protect an occupant of a vehicle. The apparatus includes an inflatable vehicle occupant protection device inflatable from a stored condition to a deployed condition in which the protection device is positioned between a portion of the vehicle and the vehicle occupant. The protection device includes a first portion and a second portion placed separately in the stored condition by at least one of rolling and folding. A deployment flap includes a sheet of material wrapped at least partially around the second portion frictionally to engage and thus inhibit initial inflation and deployment of the second portion.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIGS. 3A-3G illustrate the placement of portion of the apparatus of FIG. 1 in a deflated and stored condition.

DETAILED DESCRIPTION OF THE INVENTION

Figure 1:
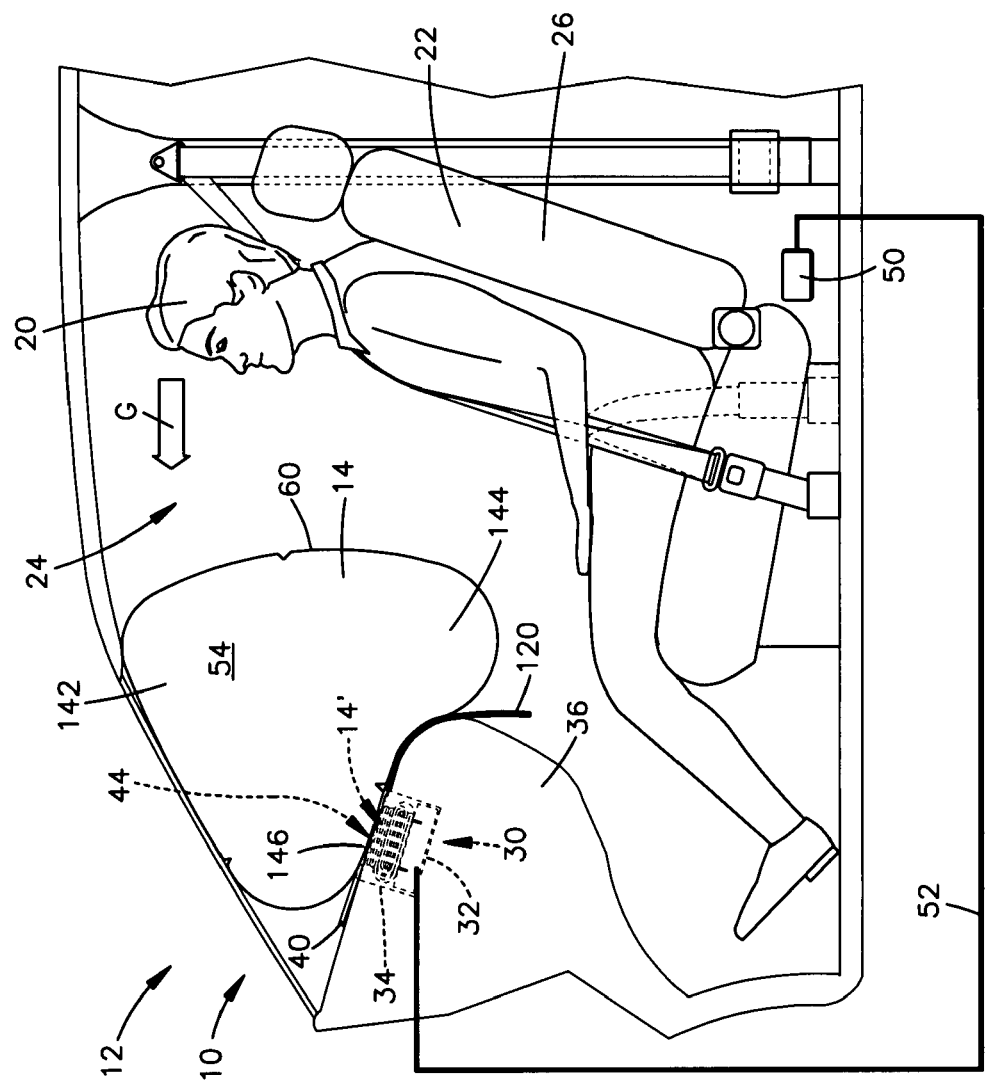
FIG. 1 is a schematic side view illustrating an apparatus for helping to protect an occupant of a vehicle with the occupant being in a first position, according to the present invention.

An apparatus 10 for helping to protect an occupant 20 of a vehicle 12 includes an inflatable vehicle occupant protection device 14 in the form of an air bag. In the embodiment illustrated in FIG. 1, the air bag 14 is a passenger frontal air bag for helping to protect an occupant 20 of a seat 22 on a passenger side 24 of the vehicle 12.

The air bag 14 may be part of an air bag module 30 that includes an inflator 32 and a housing 34. The air bag 14 has a stored condition, indicated by dashed lines at 14' in FIG. 1, in which the air bag is folded and placed in the housing 34. The air bag module 30 is mounted to a dash or instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIG. 1 to uncover an opening 44 through which the air bag 14 may be deployed from the stored condition in the housing 34. The door 40 may be connected to the vehicle 12, e.g., the instrument panel 36, either directly or through the housing 34, by means (not shown), such as a hinge, strap, or tether.

The inflator 32 is actuatable to provide inflation fluid for inflating the air bag 14. The inflator 32 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material that are interconnected by known means, such as stitching, ultrasonic welding, heat bonding, or adhesives, to form the air bag. Alternatively, the air bag 14 could have a one piece woven construction in which the air bag is woven as a single piece of material. Also, the air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

Figure 2:
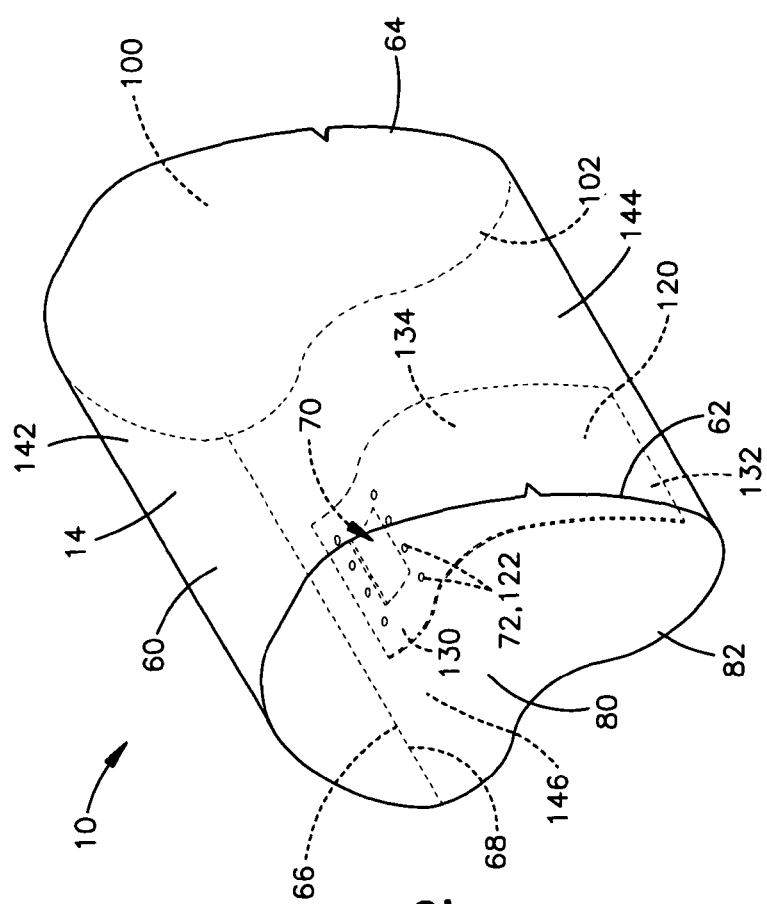
FIG. 2 is a perspective view of a portion of the apparatus of FIG. 1.

FIG. 2 illustrates by way of example one particular construction of the air bag 14 of FIG. 1. The air bag 14 includes a center panel 60 and first and second side panels 80 and 100, respectively. The center panel 60 includes first and second longitudinal edge portions 62 and 64, respectively, and opposite end portions 66 and 68, respectively.

The first and second side panels 80 and 100 have curved and contoured configurations that define the profile of the air bag 14, as shown in FIG. 1. The side panels 80 and 100 thus help define the inflated configuration (e.g., shape and depth) of the air bag 14. In this first embodiment, the side panels 80 and 100 are configured such that the inflated configuration of the air bag follows the contour of the instrument panel 36 of the vehicle 12. Those skilled in the art will appreciate that the desired inflated configuration of the air bag 14 may vary among different vehicle models, depending on factors such as available space in the passenger compartment and the architecture of the vehicle.

The center panel 60 includes an opening 70 for receiving inflation fluid for inflating the air bag 14. The center panel 60 also includes apertures 72 for receiving fasteners 74 (see FIGS. 3A-3E), such as bolts or studs, for connecting the air bag 14 to other components of the air bag module 30 (e.g., to the housing 34). When the air bag 14 is connected to the housing 34 of the air bag module 30, the opening 70 provides fluid communication between the housing 34 and an inflatable volume 54 of the air bag.

To assemble the air bag 14, the end portions 66 and 68 of the center panel 60 are interconnected to configure the center panel as an endless loop of material. A peripheral portion 82 of the first side panel 80 is interconnected with the first edge portion 62 of the center panel 60. A peripheral portion 102 of the second side panel 100 is interconnected with the second edge portion 64 of the center panel 60. When formed as a loop, the center panel 60 has a length that is equal to or about equal to the lengths of the peripheral portions 82 and 102 of the side panels 80 and 100 to which they are interconnected. The center panel 60 and side panels 80 and 100, when connected, help define the inflatable volume 54 of the air bag 14.

Figure 3A:
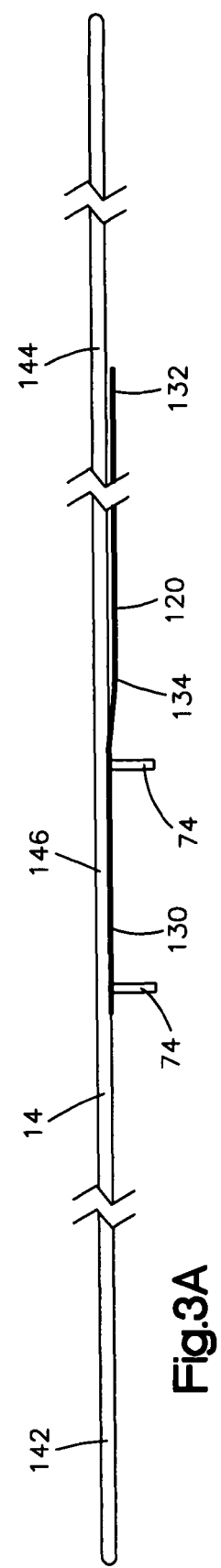

According to the present invention, the apparatus 10 includes a deployment flap 120 for helping to control deployment of the air bag 14. The deployment flap 120 is a sheet of material secured to the air bag module 30. The deployment flap 120 may, for example, be secured to the air bag module 30 via the fasteners 74 (e.g., bolts or studs) that also secure the air bag 14 to the air bag module. As shown in FIG. 3A, the deployment flap 120 is positioned beneath the air bag 14, between the air bag and the instrument panel 36. The deployment flap 120 has a first end portion 130 that includes one or more apertures 122 that align with the apertures 72 in the air bag 14 and thus receive the fasteners 74 that connect the air bag and flap to the air bag module 30.

FIGS. 3A-3G illustrate the process by which the air bag 14 is placed in the deflated and stored condition. The air bag 14 and deployment flap 120 may be placed in the deflated and stored condition prior to being secured to the air bag module 30 or while secured the air bag module 30. Referring to FIG. 3A, the air bag 14 is positioned overlying the deployment flap 120 and the fasteners 74 (e.g., studs on an air bag retainer) are passed through the aligned fastener receiving apertures 72 and 122 to maintain the relative positioning of the air bag and flap. The first end portion 130 of the deployment flap 120 is thus secured to the vehicle 12, more particularly the air bag module 30, via the fasteners 74.

The air bag 14 is maneuvered to a flattened condition as shown in FIG. 3A. In the flattened condition, the air bag 14 has a first or upper portion 142, a second or lower portion 144, and a third or base portion 146 positioned between the upper and lower portions. The base portion 146 coincides with the module housing 34 and includes the inflation fluid receiving opening 70.

The upper portion 142, lower portion 144, and base portion 146 extend laterally across the air bag 14 and laterally in the vehicle 12, as viewed from the perspective of the occupant 20 of the seat 22 when the air bag is in the inflated condition of FIG. 1. The upper portion 142 is positioned generally upward from the base portion 146 and from the module housing 34 when the air bag 14 is in the inflated and deployed condition of FIG. 1. The lower portion 144 is positioned generally downward from the base portion 146 and from the module housing 34 when the air bag 14 is in the inflated and deployed condition of FIG. 1.

Referring to FIG. 3B, the lower portion 144 is flip-folded, i.e. flipped or folded as indicated by the arrow identified at "A" in FIG. 3B about a fold line indicated generally at 150. This defines a flip-folded portion 152 of the lower portion 144. Referring to FIG. 3C, the lower portion 144 is then roll-folded back as indicated by the arrow identified at "B" in FIG. 3C toward the fold line 150. This creates a roll-folded portion 154 of the lower portion 144. As shown in FIG. 3C, the roll-folded portion 154 is positioned adjacent and overlying the flip-folded portion 152.

Figure 3E:
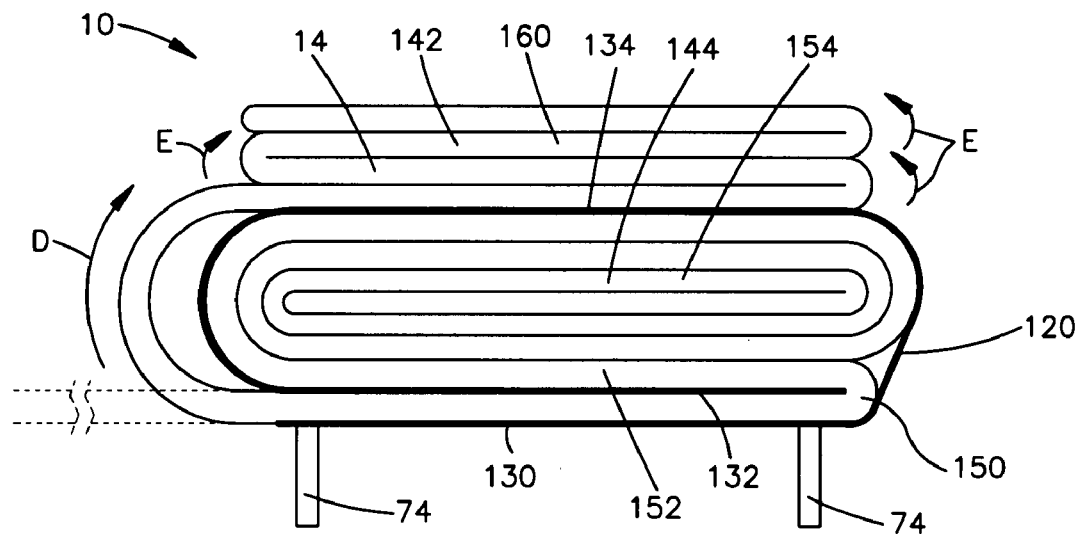

Referring to FIG. 3D, the deployment flap 120 is then wrapped around the overlying flip-folded portion 152 and roll-folded portion 154, as indicated by the arrows identified at "C" in FIG. 3D. The deployment flap 120 has a second end portion 132, opposite the first end portion 130, that is tucked between the flip-folded portion and the base portion 146 of the air bag 14. A central portion 134 of the deployment flap 120 extends over the lower portion 144 and is positioned between the lower portion and upper portion 142. The deployment flap 120 thus encircles or substantially encircles the lower portion 144. Referring to FIG. 3E, the upper portion 142 is then folded as indicated by the arrow identified at "D" in FIG. 3E to extend around and overlie the lower portion 144 wrapped in the deployment flap 120. The upper portion 142 is then fan-folded, i.e., folded back and forth in opposite directions as indicated by the arrows identified at "E" in FIG. 3E. This creates a fan-folded portion 160 of the upper portion 142 that overlies the lower portion 144 wrapped in the deployment flap 120.

The upper portion 142 and lower portion 144 are thus packaged separately in the stored condition of FIG. 3E. By "packaged separately," it is meant that the upper portion 142 and lower portion 144 are rolled, folded, or otherwise placed in the stored condition as separate and distinct portions of the air bag 14. This allows the deployment flap 120 to be wrapped around the lower portion 144 without affecting the upper portion 142.

The upper portion 142 and lower portion 144 are also packaged in manners different from each other when in the stored condition of FIG. 3E. Particularly, the upper portion 142 has a simple fan fold packaging, whereas the lower portion 144 has a flip folded and rolled packaging, as described above. Advantageously, these different packaging methods may be selected to provide desired inflation and deployment behavior of the air bag 14. For example, the fan fold of the upper portion 142 provides minimal resistance to inflation and deployment, and thus helps promote rapid unrestricted deployment of the upper portion. The flip folded and rolled of the lower portion 144 promotes inflation and deployment of the lower portion in engagement with and along the instrument panel 36, as described below.

Figure 3F:
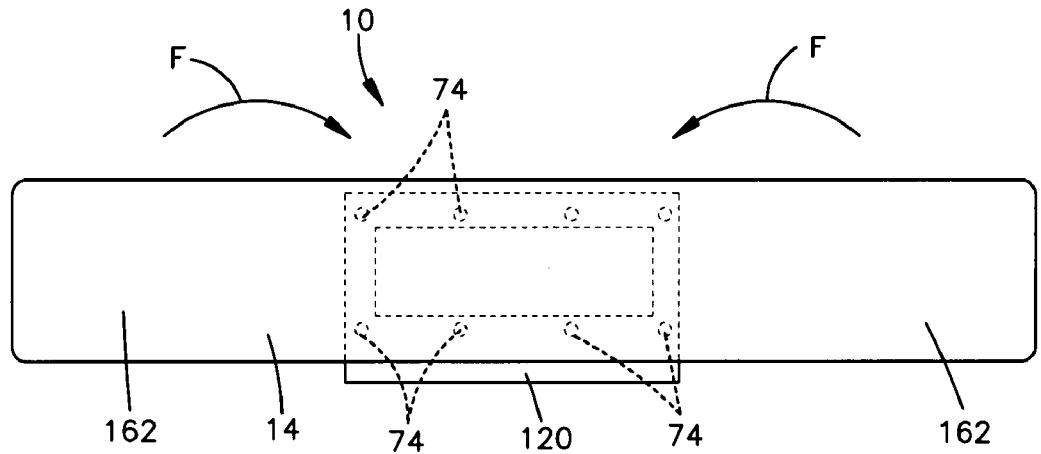
Figure 3G:
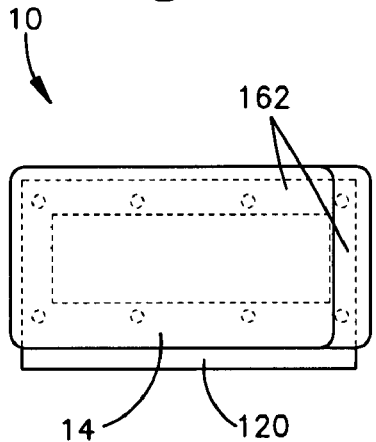

Referring to FIG. 3F, side portions 162 of the air bag 14 are folded inward as indicated by the arrows identified at "F." This places the air bag 14 in the condition illustrated in FIG. 3G, ready to be packaged and stored in the module housing 30.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition illustrated in solid lines in FIGS. 1 and 2. The air bag 14, while inflated, helps protect the vehicle occupant 20 from impacts with parts of the vehicle 12, such as the instrument panel 36.

As the air bag 14 inflates and deploys, the fan folds of the upper portion 142 offer comparatively minimal resistance to inflation and deployment. The flip folded and rolled lower portion 144 promotes inflation and deployment of the lower portion in engagement with and along the instrument panel 36. As the lower portion 144 inflates and deploys, the flip folded portion 152 initially unfolds ("flips"), placing the rolled portion 154 against the instrument panel 36. The rolled portion 154 unrolls toward the instrument panel 36, and thus engages and inflates along the instrument panel.

When an event for which inflation of the air bag 14 occurs, the occupant 20 moves in the forward direction indicated by the arrow labeled "G" in FIG. 1 into engagement with the air bag 14. In FIG. 1, the occupant 20 is shown in a normally seated position, generally upright and positioned against a backrest portion 26 of the seat 22. As a result, the air bag 14 inflates and deploys to a normally inflated position shown in FIG. 1.

Figure 4A:
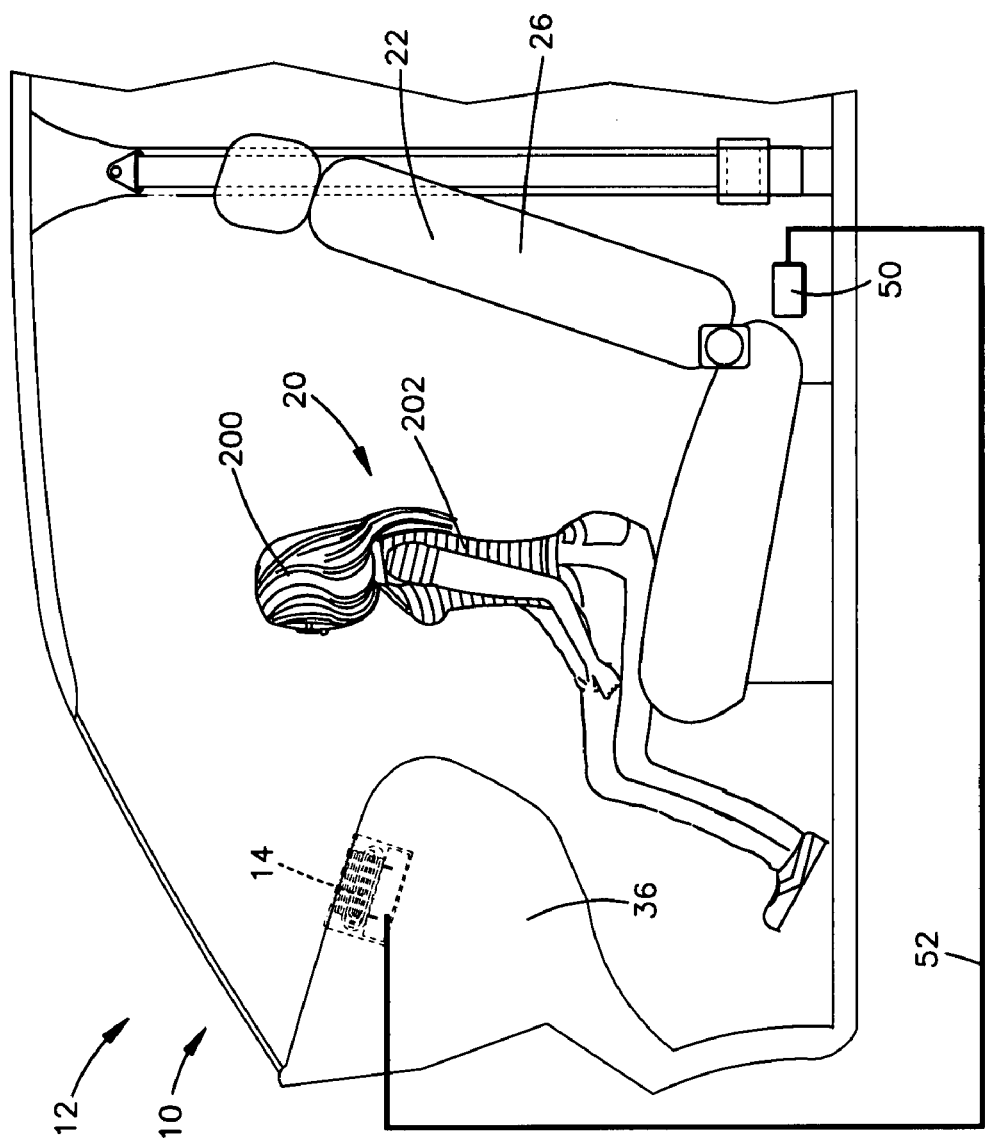
FIGS. 4A-4C are schematic views illustrating the operation of the apparatus of FIG. 1 with a vehicle occupant in a second position.

Referring to FIG. 4A, the occupant 20 is positioned away from the normally seated position. More particularly, in FIG. 4A, the occupant 20 is a small occupant, such as a small woman or child, that is unbelted and positioned forward on the vehicle seat 22, away from the backrest 26 and relatively close to the instrument panel 36. As a result, upon the occurrence of the event for which deployment of the air bag 14 is desired, the occupant 20 may move forward in the vehicle 12 in the direction identified generally at "H" in FIG. 4B into engagement with the air bag.

Figure 4B:
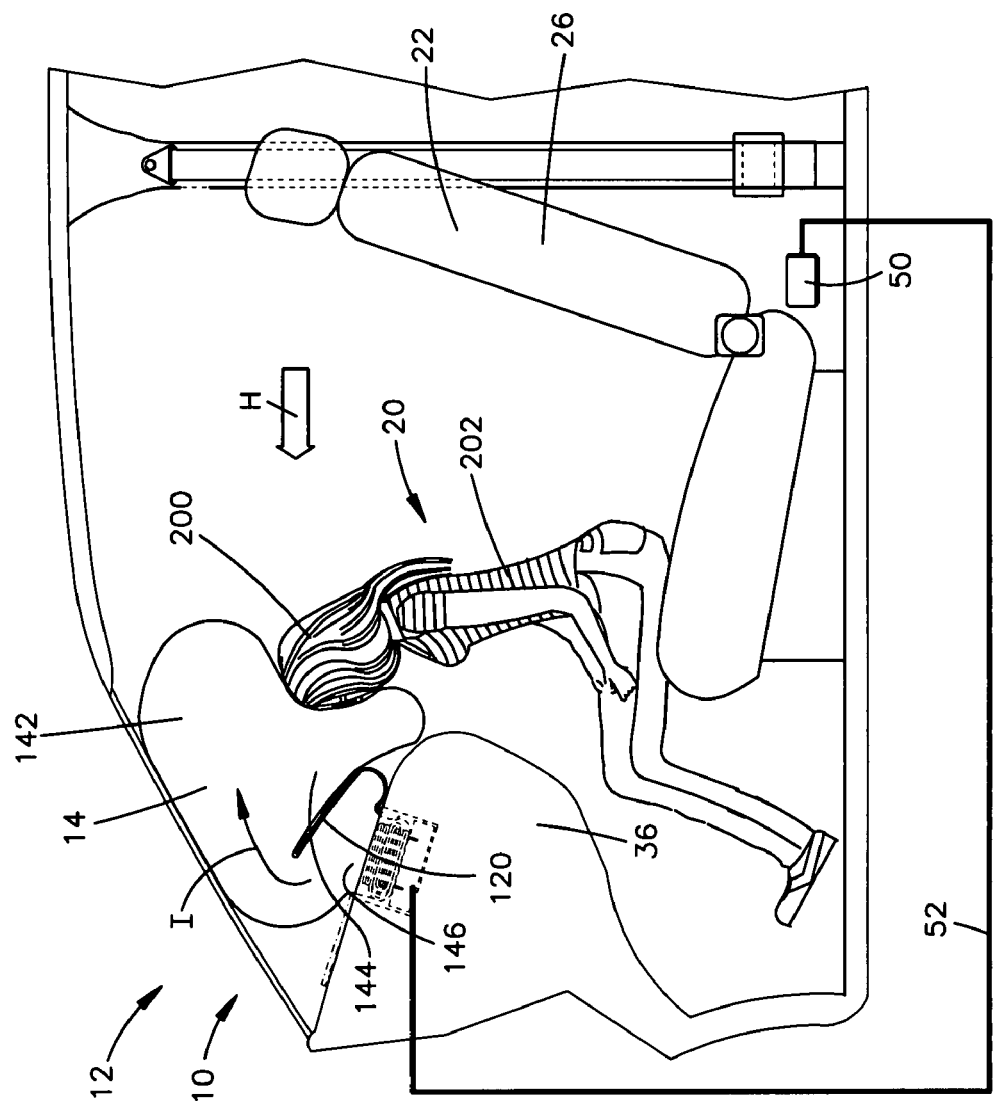
Figure 4C:
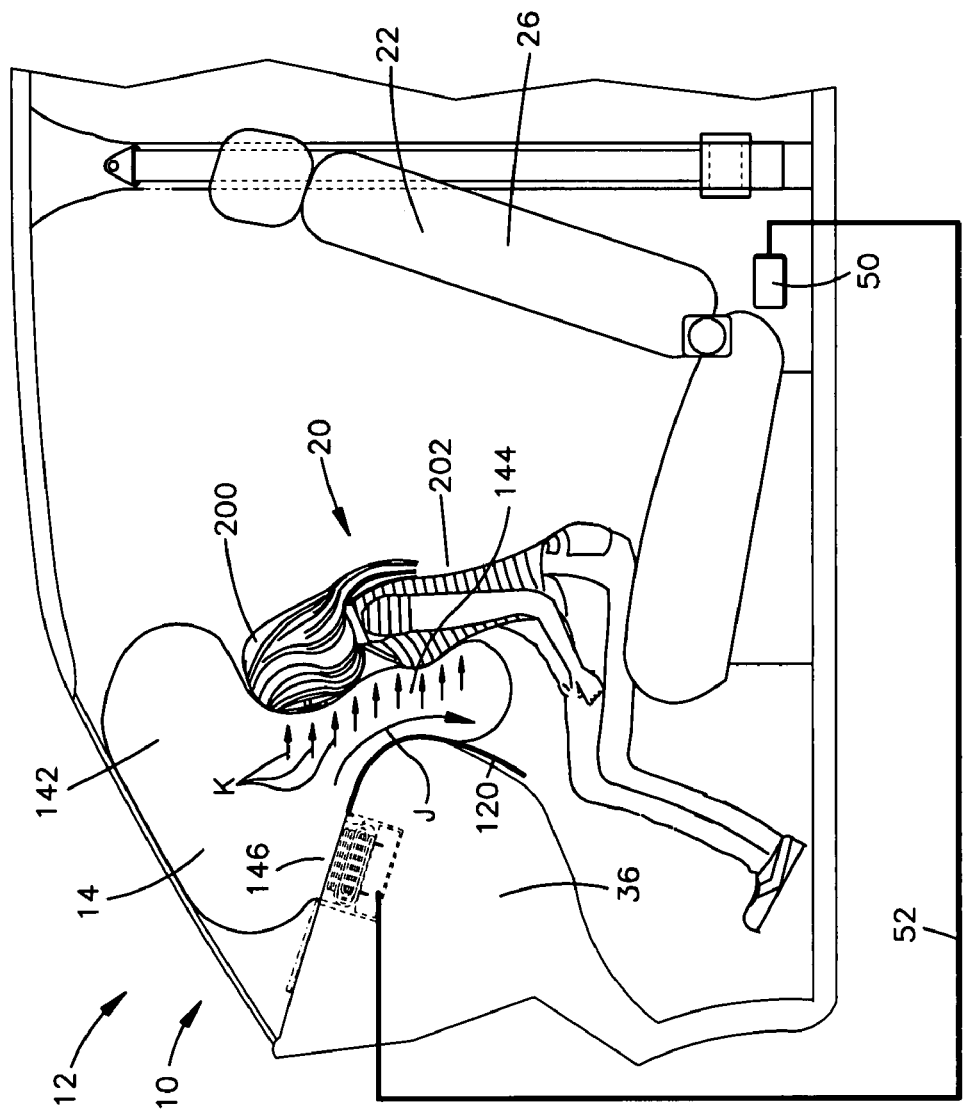

According to the present invention, the deployment flap 120 helps control deployment of the air bag 14 to help distribute inflation and deployment forces evenly across the head 200 and torso 202 of the occupant 20 if the occupant engages the air bag before the air bag reaches the fully inflated and deployed condition. This is illustrated in FIGS. 4B and 4C. Referring to FIG. 4B, prior to inflation and during the initial inflation and deployment of the air bag 14, the deployment flap 120 is wrapped around the lower portion 144 of the air bag (see also FIG. 3E). As the air bag 14 initially inflates and deploys, friction between the deployment flap 120 and the lower portion 144 impedes or inhibits the air bag from inflating and deploying freely.

Meanwhile, the upper portion 142 is free from impediment or inhibition from the deployment flap 120 and is thus free to deploy. The upper portion 142 deploys in directions generally upward and rearward in the vehicle 12, in the direction identified generally at "I" in FIG. 4B. By impeding and inhibiting the lower portion 144 from inflating and deploying freely, the deployment flap 120 may at least partially aid in directing the upper portion 142 to inflate in this direction. Because the occupant 20 is a relatively small occupant positioned relatively close to the instrument panel 36, the upper portion 142 inflates and deploys at least partially or substantially above or over the occupant's head 200.

Referring to FIG. 4C, the air bag 14 eventually inflates and pressurizes to a degree at which the friction between the deployment flap 120 and the lower portion 144 is overcome. At this point, the lower portion 144 is permitted to inflate and deploy. The lower portion 144 deploys downward along the instrument panel 36 in the direction indicated generally by the arrow identified at "J" in FIG. 4C. The lower portion 144 becomes positioned between the instrument panel 36 and the occupant 20. The deployment flap 120 moves to a position extending downward along the instrument panel 36 and becomes positioned between the air bag 14 and the instrument panel.

Once the lower portion 144 is positioned between the instrument panel 36 and the occupant 20, the air bag 14 continues to inflate and deploy toward the normally inflated and deployed condition (see FIG. 1). Because the deployment flap 120 helps direct the upper portion 142 to inflate and deploy over the occupant 20 of FIGS. 4A-4C and inhibits deployment of the lower portion 144, the air bag 14 does not impart full inflation and deployment forces on the occupant until the air bag is in the position of FIG. 4C. As a result, this helps distribute the inflation and deployment forces exerted on the occupant 20 by the air bag 14 evenly across the head 200 and torso 202 of the occupant 20, as indicated generally by the arrows identified at "K" in FIG. 4C.

From the above description of the invention, those skilled in the art will perceive improvements, changes and modifications. For example, although the present invention has been described and illustrated in a passenger frontal air bag implementation, those skilled in the art will appreciate that the present invention may have other alternative implementations, such as a driver frontal air bag implementation. Such improvements, changes and modifications within the skill of the art are intended to be covered by the appended claims.

Having described the invention, the following is claimed:

1. An apparatus for helping to protect an occupant of a vehicle, the apparatus comprising:
   an inflatable vehicle occupant protection device inflatable from a stored condition to a deployed condition in which the protection device is positioned between an instrument panel of the vehicle and the vehicle occupant, the protection device comprising an upper portion and a lower portion, each of the upper and lower portions being at least one of rolled and folded, the upper and lower portions also being positioned overlying each other when in the stored condition; and
   a deployment flap comprising a sheet of material having a first end portion secured to the vehicle, a central portion wrapped around the lower portion, and a second end portion opposite the first end portion tucked under the lower portion while the protection device is in the stored condition.

2. The apparatus recited in claim 1, wherein the central portion of the deployment flap is positioned between the upper portion and the lower portion.

3. The apparatus recited in claim 1, further comprising a housing for receiving the protection device in the stored condition, the protection device and the deployment flap being secured to the housing.

4. The apparatus recited in claim 1, wherein the protection device comprises a base portion including an opening for receiving inflation fluid, the base portion extending laterally across the protection device and being positioned between and helping to delineate the upper portion and the lower portion of the protection device.

5. The apparatus recited in claim 1, wherein the upper portion overlies the lower portion wrapped in the deployment flap when the protection device in the stored condition.

6. The apparatus recited in claim 1, wherein the protection device comprises a base portion including an opening for receiving inflation fluid, the upper portion extending substantially vertically above the opening and the lower portion extending substantially vertically below the opening when in the inflated and deployed condition.

7. The apparatus recited in claim 1, wherein the deployment flap substantially encircles the lower portion of the protection device.

8. The apparatus recited in claim 1, wherein the upper portion and lower portion are at least one of rolled and folded separately from each other.

9. The apparatus recited in claim 1, wherein the lower portion when in the stored condition comprises a flip folded portion and a roll folded portion.

10. The apparatus recited in claim 1, wherein the upper portion when in the stored condition comprises a fan folded portion.

11. The apparatus recited in claim 1, wherein the lower portion when in the stored condition is packaged differently than the upper portion.

12. The apparatus recited in claim 1, wherein the protection device comprises a frontal air bag for helping to protect a front seat occupant of the vehicle.

13. The apparatus recited in claim 1, wherein the protection device comprises a passenger frontal air bag for helping to protect a front seat occupant on a passenger side of the vehicle.

14. The apparatus recited in claim 1, wherein the protection device comprises a portion of an air bag module mounted in the instrument panel of the vehicle.

15. The apparatus recited in claim 1, wherein the deployment flap helps inhibit initial inflation and deployment of the lower portion, the deployment flap being free from inhibiting initial inflation and deployment of the upper portion.

16. An apparatus for helping to protect an occupant of a vehicle, the apparatus comprising:
an inflatable vehicle occupant protection device inflatable from a stored condition to a deployed condition in which the protection device is positioned between a portion of the vehicle and the vehicle occupant, the protection device comprising a first portion and a second portion placed separately in the stored condition by at least one of rolling and folding; and
a deployment flap comprising a sheet of material wrapped at least partially around and tucked under the second portion to frictionally engage and thus inhibit initial inflation and deployment of the second portion.

17. The apparatus recited in claim 16, wherein the first portion inflates and deploys free from inhibition from the deployment flap.

18. The apparatus recited in claim 16, wherein the first portion comprises an upper portion of the air bag and the second portion comprises a lower portion of the air bag.

19. The apparatus recited in claim 18, wherein the protection device comprises a base portion including an opening for receiving inflation fluid, the upper portion extending substantially vertically above the opening and the lower portion extending substantially vertically below the opening when in the inflated and deployed condition.

20. The apparatus recited in claim 18, wherein the deployment flap comprises a sheet of material having a first end portion secured to the vehicle, a central portion wrapped around the lower portion, and a second end portion opposite the first end portion tucked under the lower portion while the protection device is in the stored condition.

21. An apparatus for helping to protect an occupant of a vehicle, the apparatus comprising:
an inflatable vehicle occupant protection device inflatable from a stored condition to a deployed condition in which the protection device is positioned between an instrument panel of the vehicle and the vehicle occupant, the protection device comprising an upper portion and a lower portion, the protection device having a stored condition in which each of the upper and lower portions are at least one of rolled and folded separately from each other;
a housing for containing and supporting the protection device in the stored condition;
at least one fastener that extends through the protection device to secure the protection device to the housing; and
a deployment flap comprising a sheet of material wrapped externally around the lower portion of the protection device to inhibit inflation of the lower portion while permitting unrestricted inflation of the upper portion, the deployment flap comprising:
a first end portion positioned between the housing and the protection device, the at least one fastener extending through the first end portion to connect the first end portion to the housing;
a central portion wrapped around the lower portion of the protection device; and
a second end portion opposite the first end portion tucked in a fold of the lower portion while the protection device is in the stored condition.

22. The apparatus recited in claim 21, wherein the lower portion when in the stored condition comprises a flip folded portion and a roll folded portion, the second end portion of the flap being tucked in the flip folded portion.

23. The apparatus recited in claim 1, wherein the lower portion when in the stored condition comprises a flip folded portion and a roll folded portion, the second end portion of the flap being tucked in the flip folded portion.

* * * * *